(12) United States Patent
Okada et al.

(10) Patent No.: US 10,782,917 B2
(45) Date of Patent: Sep. 22, 2020

(54) STORAGE DEVICE

(71) Applicant: HITACHI, LTD., Tokyo (JP)

(72) Inventors: Naoya Okada, Tokyo (JP); Masanori Takada, Tokyo (JP); Mitsuo Date, Tokyo (JP); Sadahiro Sugimoto, Tokyo (JP); Norio Simozono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 163 days.

(21) Appl. No.: 16/083,952

(22) PCT Filed: May 12, 2016

(86) PCT No.: PCT/JP2016/064148
§ 371 (c)(1),
(2) Date: Sep. 11, 2018

(87) PCT Pub. No.: WO2017/195324
PCT Pub. Date: Nov. 16, 2017

(65) Prior Publication Data
US 2020/0192601 A1 Jun. 18, 2020

(51) Int. Cl.
*G06F 3/06* (2006.01)

(52) U.S. Cl.
CPC .......... *G06F 3/0659* (2013.01); *G06F 3/0604* (2013.01); *G06F 3/0637* (2013.01); *G06F 3/0679* (2013.01)

(58) Field of Classification Search
None
See application file for complete search history.

(56) References Cited

U.S. PATENT DOCUMENTS 7,761,657 B2 7/2010 Nakajima
2008/0022062 A1* 1/2008 Nagahori .............. G06F 3/0665
711/163

OTHER PUBLICATIONS

International Search Report of PCT/JP2016/064148 dated Jun. 28, 2016.

* cited by examiner

*Primary Examiner* — Charles J Choi
(74) *Attorney, Agent, or Firm* — Mattingly & Malur, PC

(57) ABSTRACT

High reliability and high performance of a storage device formed of a Dual port NVMe SSD are achieved while preventing the risk of destruction of data. The storage device includes a main memory that belongs to each of two or more clusters and that stores data related to an IO request; and a processor belonging to each of the clusters controlling accesses to the main memory. The main memory includes a first region where writing from the memory drive is permitted and a second region where the writing is prohibited. The processor selects the first region as a transfer destination related to the IO request from the memory drive when the IO request is a first request, and selects the second region as the transfer destination related to the IO request from the memory drive while permitting writing to the second region when the IO request is a second request.

8 Claims, 5 Drawing Sheets

[FIG. 1]
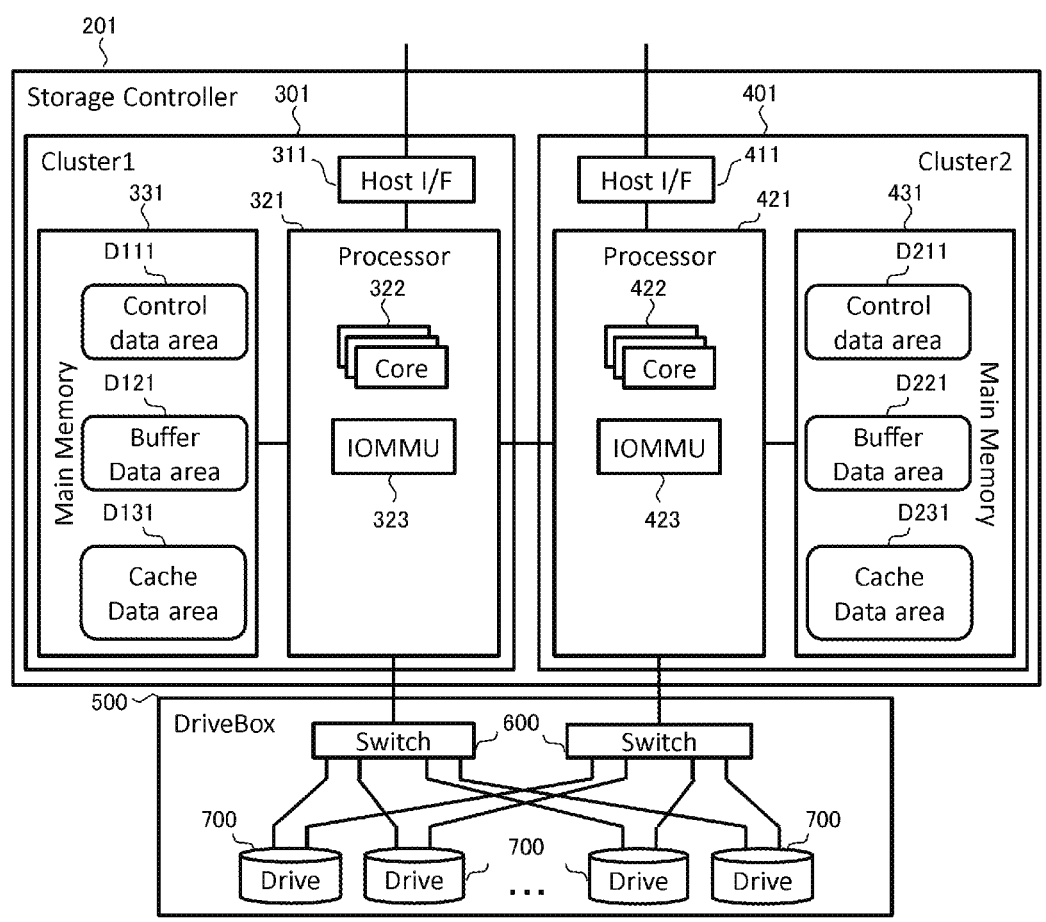

[FIG. 2]
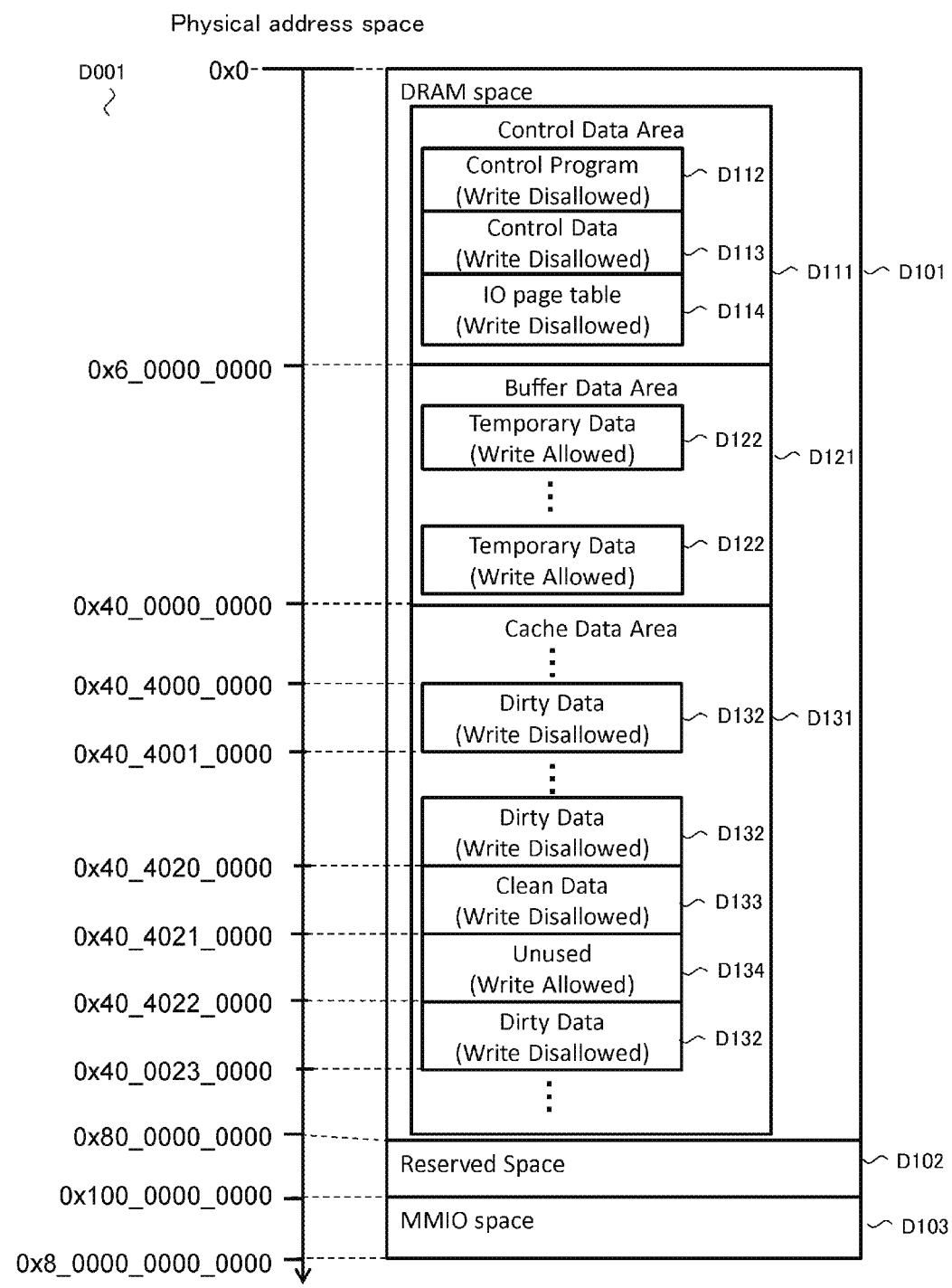

[FIG. 3]

| Device | Physical Address | Page Size | Memory Access control | |
|---|---|---|---|---|
| | | | Read | Write |
| Drive1 | 0x0_0000_0000 | 1 GB | Disallowed | Disallowed |
| | ... | ... | ... | ... |
| | 0x5_C000_0000 | 1 GB | Disallowed | Disallowed |
| | 0x6_0000_0000 | 1 GB | Allowed | Allowed |
| | 0x6_4000_0000 | 1 GB | Allowed | Allowed |
| | ... | ... | ... | ... |
| | 0x3F_C000_0000 | 1 GB | Allowed | Allowed |
| | 0x40_0000_0000 | 1 GB | Allowed | Disallowed |
| | 0x40_4020_0000 | 2 MB | Allowed | Disallowed |
| | 0x40_4020_0000 | 4 kB | Allowed | Disallowed |
| | ... | ... | ... | ... |
| | 0x40_4020_F000 | 4 kB | Allowed | Disallowed |
| | 0x40_0021_0000 | 4 kB | Allowed | Allowed |
| | ... | ... | ... | ... |
| | 0x40_0021_F000 | 4kB | Allowed | Allowed |
| | 0x40_4022_0000 | 4 kB | Allowed | Disallowed |
| | ... | ... | ... | ... |
| | 0x40_4022_F000 | 4 kB | Allowed | Disallowed |
| | 0x40_4023_0000 | 1 GB | Allowed | Disallowed |
| | ... | ... | ... | ... |
| | 0x80_0000_0000 | 1 GB | Disallowed | Disallowed |
| | ... | ... | ... | ... |
| | 0x100_0000_0000 | 1 GB | Disallowed | Disallowed |
| | ... | ... | ... | ... |
| Drive 2 | ... | ... | ... | ... |
| ... | ... | ... | ... | ... |

T101　T102　T103　T104

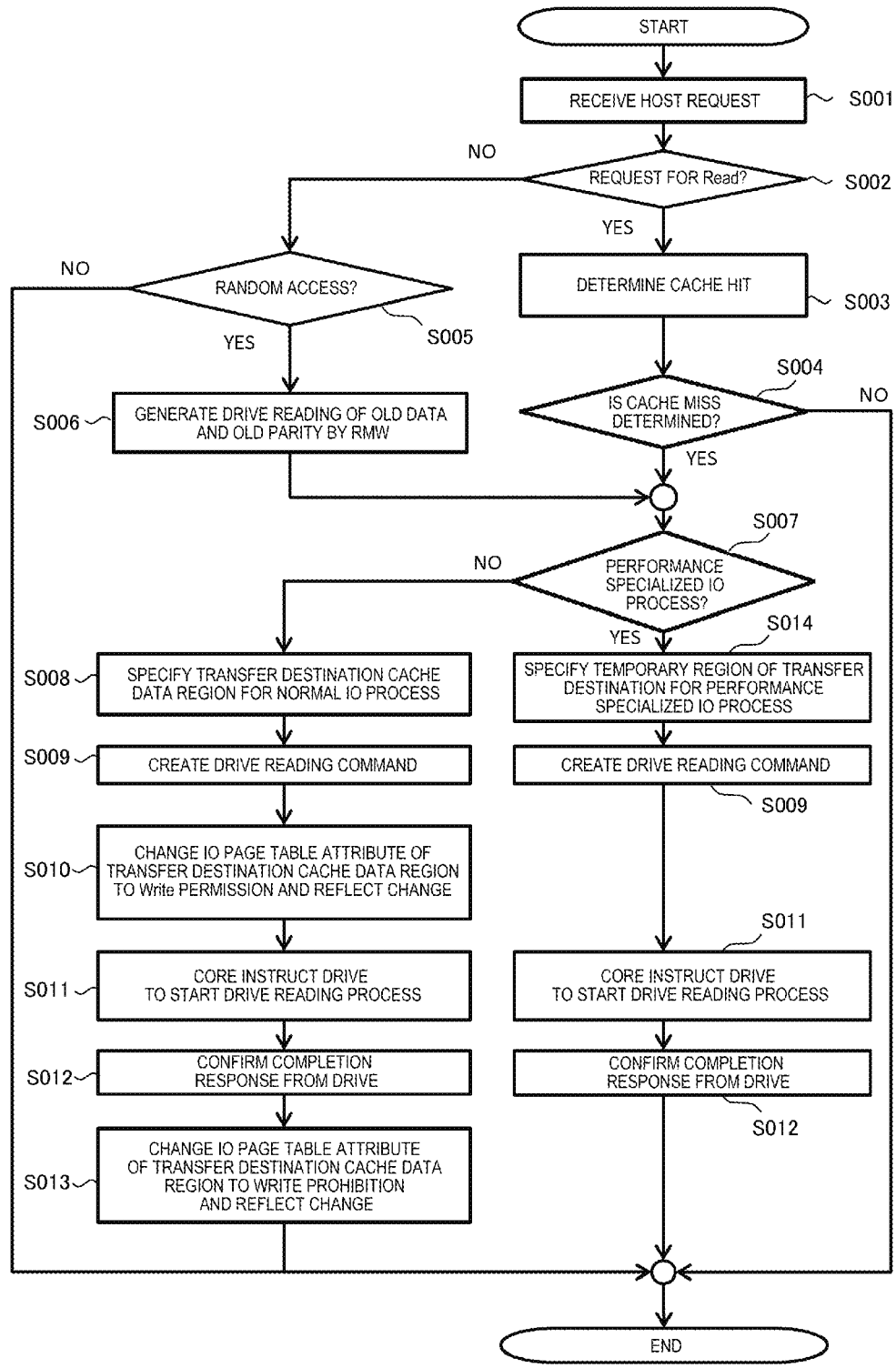
[FIG. 4]

[FIG. 5]
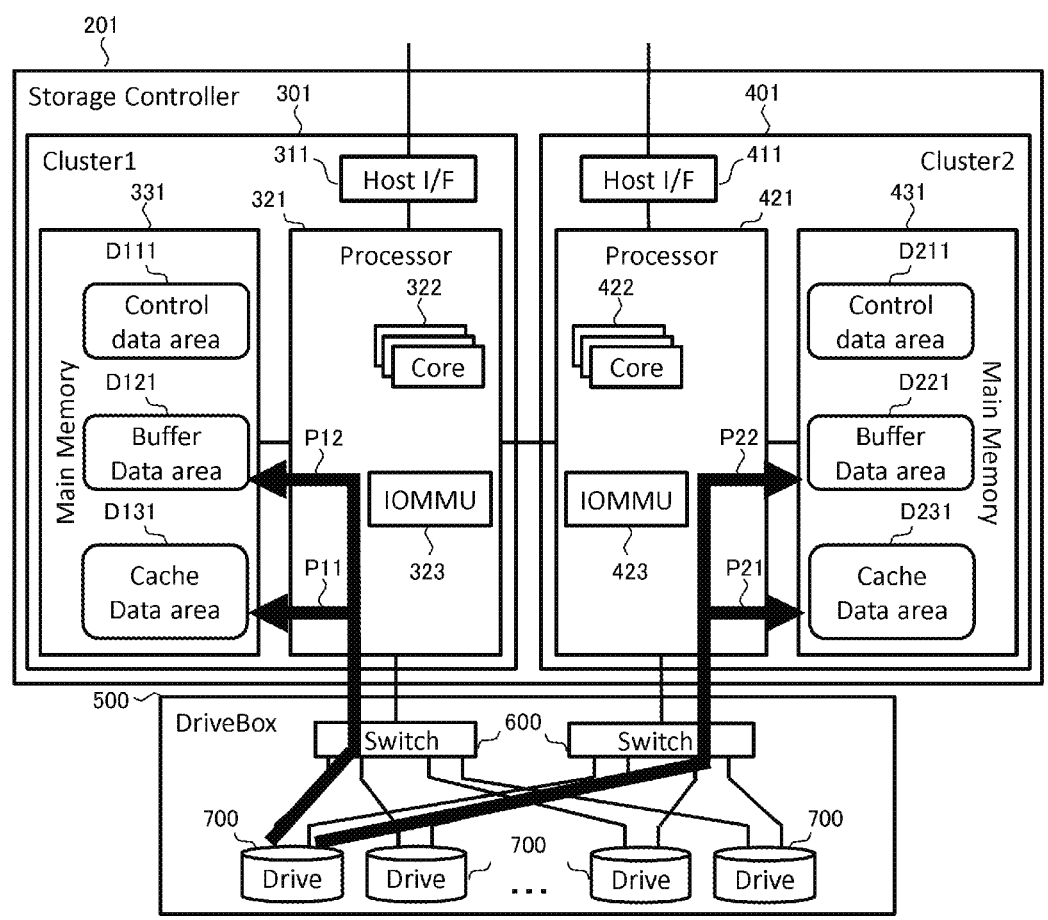

STORAGE DEVICE

TECHNICAL FIELD

The present invention relates to a storage device configured with an SSD.

BACKGROUND ART

In the related art, communication with an SAS drive is realized using a device controller (hereinafter referred to as an "SAS CTL") with an SAS protocol I/F. The SAS CTL converts an SAS data transfer into a memory write according to command contents. Thus, the SAS CTL accepts only the SAS data transfer according to the command contents, and the memory write is not executed if there is an error in the SAS data transfer. Therefore, the SAS CTL may not access user data of both CTLs and the possibility of destroying the user data of both CTLs due to drive failure was relatively small.

On the other hand, in order to realize high availability, a drive having two NVM Express (hereinafter referred to as "NVMe") I/Fs may be connected to both processors of a storage device in which a storage cluster is redundant via PCIe, and may directly access the main memory of both storage clusters.

SUMMARY OF INVENTION

Technical Problem

A storage device configured with a dual port NVMe SSD Drive (hereinafter, SSD is assumed to have a dual port configuration unless otherwise stated) has no SAS drive controller that detects unauthorized data transfer between the processor and the drive where the SSD is directly connected to both storage clusters. Thereby, the storage cluster may not prevent the unauthorized data transfer by the SSD drive. Further, if the SSD becomes uncontrollable due to a failure or the like and the SSD performs the unauthorized data transfer to both storage clusters, the storage clusters cannot prevent the data transfer. As a result, host data stored in the main memory of both storage clusters may be destroyed due to unauthorized data transfer, therefore, the risk of destroying data by the SSD drive increases, which leads to a reduction in reliability.

As this risk of data destruction increases, there is a proposed data transfer control method using IOMMU (IOMMU will be described later) as a mechanism for controlling the data transfer of the IO device. This control method loads information of an IO page table for converting a physical address and a virtual address created by a control program into the IOMMU, and make the IOMMU to determine which device may execute which data transfer, and the control program may control the data transfer of the IO device. For example, when it is desired to realize data transfer from the SSD to the main memory of the storage cluster, the control program operates the IO page table and rewrites the attribute of the memory access right for the specific address described in the IO page table. Thus, by preventing the control program from accepting the memory write for the main memory of the storage cluster from the SSD, it makes possible to prevent the destruction of data on the main memory due to unintended data transfer of the drive.

However, in order to manipulate the IO page table of the IOMMU by the program and to reflect changed contents, a processing time spent by the program increases and a time required for one IO processing greatly increases. Thus, it is difficult to realize high performance by applying the IOMMU to each IO processing simply.

Therefore, a challenge of the invention is to achieve both high reliability and high performance of the storage device configured with the Dual port NVMe SSD.

Solution to Problem

A storage device according to the present invention includes two or more clusters, a memory drive connected to each of the clusters, a main memory belonging to each of the clusters to store data related to an IO request, and a processor belonging to each of the clusters to control access to the main memory, wherein the main memory includes a first region where writing from the memory drive is permitted, and a second region where the writing is prohibited, and the processor selects the first region as a transfer destination of data related to the IO request from the memory drive when the IO request is a first request, and selects the second region as the transfer destination of data related to the IO request from the memory drive while permitting writing to the second region when the IO request is a second request.

Advantageous Effects of Invention

According to the present invention, it is possible to prevent dirty data destruction of both storage clusters and to improve the reliability of a device. That is, even when an unauthorized memory write occurs in both systems due to a drive failure, it is possible to prevent the dirty data in a cache region on a main memory of both storage clusters from being simultaneously destroyed while maintaining the performance of the device. Further, host request contents are determined and then an IO page table is operated only when necessary, so that it is possible to minimize an influence on the IO processing performance of the storage device. Consequently, it is possible to achieve both high reliability and high performance of a storage device configured with a Dual port NVMe SSD.

BRIEF DESCRIPTION OF DRAWINGS

FIG. 1 is a figure illustrating a hardware configuration of an entire storage device.

FIG. 2 is a figure illustrating a system physical address space of a storage controller, and a corresponding relationship between the type of data stored in a main memory and the address.

FIG. 3 is a figure illustrating a data structure of an IO page table.

FIG. 4 is a flowchart illustrating a memory-access-right switching determination process.

FIG. 5 is a figure illustrating a data transfer path from a drive to a main memory.

DESCRIPTION OF EMBODIMENTS

Embodiments of the present invention will be described below with reference to the accompanying drawings as Example 1.

Example 1

FIG. 1 is a figure illustrating a hardware configuration of an entire storage device according to Example 1 of the invention.

Reference character 201 denotes a storage controller of the storage device. The storage device permanently stores data transferred from another computer. In order to realize high availability of the storage device, the storage controller adopts a redundant configuration to two or more storage clusters. Example 1 shows an example where two storage clusters are formed.

Reference character 301 (401) denotes a storage cluster of the storage device. The storage cluster includes a host I/F, a main memory and a processor, accepts a request from a host (not shown), and performs the input/output processing of data.

Reference character 311 (411) denotes a host I/F, which is an interface (I/F) implementing communication between another computer (e.g. host) and the storage cluster. The host I/F is typically a Fibre Channel I/F connecting the processor and the PCI Express to implement communication between the storage cluster and the host. The host I/F may be various I/Fs such as an Ethernet adapter, an InfiniBand Host Bus adapter, a PCI Express bridge, and combinations thereof.

Reference character 321 (421) denotes a processor to implement data communication between the host I/F and the drive in the drive box. The processor is operated by a storage control program. Typically, due to the redundancy of the storage cluster, the processor is connected to another processor of the other storage cluster via an I/F such as the PCI Express, so that the processor may access the main memory of another processor. However, the processor may implement communication with the storage clusters via the host I/F without being connected to another processor. Further, communication may be implemented by providing a data transfer bus for communication with storage clusters, between switches in the drive box that will be described later. Furthermore, two or more processors may be mounted in one storage cluster.

Reference character 322 (422) denotes a processor core, which is one of functional parts that make up the processor. One or more processor cores are provided per processor.

Reference character 323 (423) denotes an IO Memory Mapping Unit (hereinafter referred to as "IOMMU"), which is one of functional parts that make up the processor. The IOMMU controls the permission of the read/write of the main memory by the PCIe device connected to the processor, and address conversion according to the description contents of the IO page table. For example, the address conversion table (IO page table) is maintained (cache) and the switching of address conversion is controlled by the IOMMU.

Reference character 331 (431) denotes the main memory of the processor (hereinafter simply referred to as the "main memory"), which is typically composed of a volatile medium, such as a DRAM. However, some or all of the main memory of the processor may be composed of a non-volatile medium such as a NAND Flash, a STT-RAM, or a PCM.

Reference character D111 (D211) denotes a control data region in which control data is stored to control the operation of the storage device in a main memory 331 (431). This will be described below in detail.

Reference character D121 (D221) denotes a buffer data region, which is a region on the main memory 331 (431) to temporarily store data. This will be described below in detail.

Reference character D131 (D231) denotes a cache data region, which is a region on the main memory 331 (431) to store host data. This will be described below in detail.

Reference character 500 denotes a drive box on which a plurality of drives is mounted. The drive box has a switch and a drive therein. Typically, in order to increase the data capacity that may be stored, a port for extension is formed in a switch section so that a plurality of drive boxes may be connected to the system. The drive box may have no connection I/F for extending the drive box. Further, the drive box may be integrated with a casing of the storage device.

Reference character 600 denotes the switch in the drive box, and is a switch for mounting a plurality of drives. Typically, the switch is connected to the processor of the storage cluster, the drive in the drive box and another drive box via the PCI express. Although it is shown in the drawing that the switch is connected with one storage cluster, the switch may be connected with the processors of two storage clusters.

Reference character 700 denotes the drive. The drive is typically connected to the switch 600 via the PCI express, and implements communication between the processor and the drive by the NVM express protocol. Further, the drive has two PCI express I/Fs, allows the access to the drive from both of the two storage clusters, and improves the availability of the drive.

FIG. 2 is a figure illustrating a system physical address space of a storage controller, and a corresponding relationship between the type of data of a main memory located in the space and the address.

Reference character D001 denotes the physical address space. The size of the physical address space is determined by the size of the address space that may be managed by the processor.

Reference character D101 denotes a DRAM space, and is mapped to the physical address space. The DRAM space typically corresponds to the address of the main memory of the processor, and data located in the DRAM space is stored in the main memory. In the case where some or all of the main memory is composed of the non-volatile medium, the address in the non-volatile medium may be mapped in the DRAM space. Further, some or all of the DRAM space may correspond to the address in the non-volatile medium.

Reference character D102 denotes a reserved region, and is a region that is not allocated as a resource on the physical address. The control program may freely change the start address and the termination address of the reserved region.

Reference character D103 denotes the MMIO space, and is a space in which the control program serves as an I/F for inputting/outputting data to/from the PCI device. Similarly to the reserved region, the control program may freely change the size of the MMIO space.

Reference character D111 denotes a control data region, which is located in the DRAM space. In the control data region, program data for controlling the storage device, control data required for the control and the IO page table for performing the memory access right and address conversion of the IOMMU are stored. Typically, since the control data region controls the storage device, access to data on the control data region is permitted only in a specific one or more processor cores and software.

Reference character D112 denotes a control program, which is program data for controlling the storage device. The control program is typically an operating system (OS) of the storage device. Specifically, the control program manages and operates data transfer instructions to the host I/F or the drive, and the control data (described later). Further, the control program may be a hyper visor and a virtual machine that operates on the hyper visor, and a plurality of virtual machines may be present. In the case where the plurality of virtual machines is installed, if at least one virtual machine controlling the storage device is present, other virtual machines may operate an application that is not related to the operation of the storage device.

Reference character D113 denotes control data, and is data required for controlling the storage device. Typically, the control data includes a cache directory for managing the cache data, a table for managing the buffer data region, volume management information for managing the drive data, command data for controlling the device, shared data to be shared among storage clusters, etc.

With respect to the cache directory in the control data, the storage device manages the cache directory by one management unit with 64 kB called a segment. Specifically, for each sub-block of 520B in the segment of a segment state, LRU information (determination material in determining whether or not to be subject to destage processing), and MRU information, it is managed by a list holding information such as a bit map indicating whether the state is in a dirty state or a clean state and a physical address for storing data.

Further, regarding the table for managing the buffer data region, the storage device manages the buffer data region with a table that stores minimum information required for IO processing, such as a process ID, volume information, source drive information and region occupancy information for performing host IO processing in order to reduce the amount of data and the amount of processing to be referred in the performance specialized IO processing that will be described later.

Reference character D114 denotes an IO page table, which is a table necessary for the IOMMU to provide address conversion and memory-access-right control functions to the device connected to the processor. The IO page table has a data structure shown in FIG. 3. The IOMMU determines that the IOMMU allows a device to input into or output from a selected address based on the IO page table or not. The processor core can rewrite the contents of the IO page table. Further, the processor core can invalidate the IO page table cached in the IOMMU by operating the register of IOMMU and fetch the new IO page table after rewriting. By this operation, the processor core may change and reflect the control of the memory access right to the specific device as necessary.

Reference character D121 denotes a buffer data region, which is a region to store buffer data that is temporary data when IO is performed between the storage device and the host. The buffer data is not managed by the cache control. Thus, the data transfer using the buffer region is shorter in processing time than the data transfer via the cache data region which will be described later and may be used for data transfer processing which requires high performance.

Reference character D122 denotes temporary data, and is data that is temporarily stored in the buffer data region D121. The temporary data is quickly discarded when the host request processing is completed, so that the buffer data region can be used in the next host request processing.

Reference character D131 denotes a cache data region, and is a region on the main memory to store host data. It is intended to improve the data input/output performance of the storage device by allowing the host data to be stored in the cache data region. The storage device sets the cache data on the cache data region as the subject of cache control of the storage device, and manages the host data on the cache region by the cache directory in the control data D113.

Reference character D132 denotes dirty data, and is data that is not destaged to the drive of the storage device, and is the host data stored in the cache data region D131. Since the dirty data is the host data that is present only on the main memory, it disappears when the main memory is volatilized.

Thus, the dirty data is normally redundant between clusters, and the redundancy state is maintained until destage occurs. In order to avoid the loss of the dirty data due to the unauthorized data transfer by the failed drive, in the physical address region in which the dirty data is stored, memory write by the drive is always disallowed by setting the memory access right of the entry of the IO page table. However, for the memory read by the drive, since the possibility of data being destroyed is small, the memory access right may be allowed. However, if the drive is a low function and low cost drive that cannot check the reliability of the user data, the memory access right of dirty data may be disallowed in order to protect data destruction in the drive by transferring data to a wrong address in the drive.

Reference character D133 denotes clean data, and is data that is destaged in the drive of the storage device, and is the host data stored in the cache data region D131. Since the clean data is host data that is present in both the main memory and the drive, even if the main data volatilizes and the clean data disappears, it may be restored by staging from the drive. As such, since the clean data may be recovered, redundancy between the clusters is not required. Even if the clean data is lost due to unauthorized data transfer of the failed drive, it can be recovered by staging from the drive again. Thus, in the physical address region in which the clean data is stored, memory write by the drive is allowed by setting the memory access right entering the IO page table. Likewise, for the memory read by the drive, since the possibility of data being destroyed is small, the memory access right may be allowed.

Reference character D134 denotes an unallocated region in the cache data region D131. When the control program transfers data from the main memory to the host I/F or the drive, the control program selects a segment as a data transfer destination of the host I/F or the drive, based on the cache directory. At this time, if the unallocated region is present in the cache data region, the control program uses the exclusive unallocated region as the data transfer destination. If there is no unallocated region, the control program makes transition to the unallocated state by selecting a segment which has the clean data according to the LRU or MRU and or makes transition to the unallocated state by destaging the dirty data and making the transition from the dirty state to the clean state, thus exclusively using it as the data transfer destination. After the data transfer is completed, the control program updates the cache directory, and the segment makes transition from the unallocated state to the dirty state or the clean state.

FIG. 3 is a figure illustrating a data structure of the IO page table.

The IO page table includes a field for storing control target device information T101, a field for storing a start physical address T102 of a memory access control target region, a field for storing a page size T103 representing the size of the memory access control target region, and a field for storing information of the memory access right T104 of a control target device. The IO page table may include other fields.

The control target device information T101 represents an identifier for designating the PCI device to be subjected to memory access control. This identifier typically includes three numbers, a bus number of the PCI, a device number, and a function number. The function number may use a virtual function number. The memory access right of the device may be controlled by a bus unit, a device unit or a function unit.

The start physical address T102 of the memory access control target region specifies the start address of the physical address for the memory access of the control target device.

Typically, the size of the page size T103 can be specified, such as 4 kB, 2 MB, or 1 GB, and can be changed depending on the design.

The memory access right T104 stores permission/prohibition information of memory read and memory write for determining the memory access of the control target device. Thus, the memory access right of the device is controlled.

Typically, this IO page table is stored in the main memory, but some or all of copies of the IO page table may be stored in the buffer in the drive.

FIG. 4 is flowchart illustrating a memory-access-right switching determination process.

In the memory-access-right switching determination process, after the storage device receives the IO request from the host, the storage device permits or prohibits the memory write by the drive according to the contents to be processed by the storage device, which correspond to the IO request. In this determination process, the subject of the process after the storage device receives the IO request from the host is a processor core of the storage device (hereinafter referred to as a "core").

Step S001 is a step in which the core receives the host request and interprets the request. The host I/F converts the protocol between the host and the storage device into the SCSI command, and the host I/F writes it in the main memory. The core reads the host request that is converted into the SCSI command in the main memory, and then interprets contents. The host request includes a data transfer length, an IO process type representing a process type such as a Read process or a Write process for the storage device, volume management information such as LUN in which data is stored, and LBA representing an address of a data storage source. The core determines the contents of the next process that is to be performed by the storage device according to the contents of the host request.

Step S002 is a step of conditional branching in which the core interprets the content of the host request and determines whether it is a read request or not. If the host request type is a Read request, that is, a data transfer request from the storage device to the host (YES), the process proceeds to step S003. If other request types, for example, a Write request, that is, a data transfer request from the host to the storage device (NO) is present, the process proceeds to step S005.

First, the subsequent process in the case of the Write request (the determination result of Step S002 is NO) will be described.

In step S005, the core analyzes the IO pattern of the write request of the host and determines whether or not to perform the random access process. The IO pattern of the host request is typically classified into two accesses including random access which has a small data transfer length of 512 B to several tens of kilobytes, an access range as a storage destination of write data is large and locality is small, and sequential access which has a long data transfer length of several tens of kilobytes to 1 MB and the access destination has continuity.

When it is determined that the pattern is the sequential write (NO), the core generates the parity using only the data received from the host and makes redundancy, so the process of reading old data that is already stored in the drive from the drive is not performed. Therefore, when the access pattern is the sequential write, the core determines that it is unnecessary to perform the permission/prohibition switching of the memory write by the drive at the time of reading from the drive (hereinafter referred to as "drive read processing"), and then terminates the memory-access-right switching determination process. Meanwhile, if the pattern is the random write (YES), the process proceeds to step S006 that will be described later.

Step S003 is a step of determining cache hit in the Read process of the storage device. The storage device uses the main memory of the processor as the data cache and improves input and output performance of the storage device. The core executes the cache hit determination process, and checks whether data requested by the host exists on the cache region. Specifically, the core refers to the cache directory stored in the control data region and checks whether the data requested by the host is registered in the cache directory.

Step S004 is a step of determining a cache miss by the cache hit determination process of step S003. If it is confirmed that the data requested in the cache directory has been registered and there is data to be requested on the cache region (NO), it is determined as a cache hit. Meanwhile, if it is confirmed that the data requested in the cache directory is not registered and there is no data to be requested on the cache region (YES), it is determined as a cache miss. When a cache miss occurs, the core performs a process (Read Miss process) corresponding to the cache miss.

When it is determined to be the cache miss (YES), in order to transfer data to the host, it is necessary for the core to stage the data requested from the drive to the main memory, so that the process proceeds to step S007.

When it is determined to be the cache hit (NO), the core can read the host data on the cache region and then transfer the data to the host. Therefore, it is unnecessary to perform the drive read processing, and the core terminates the memory-access-right switching determination process.

On one hand, step S006 is a step of executing the drive read process that occurs in the destage process in the random write process. When the access pattern is random, the cache data is updated in a data length smaller than the management unit of the cache data, and it is necessary to update the old parity data at the time of destage. Since the cache data is updated in the data length smaller than the management unit, new data and old data are mixed in one cache data. Thus, the core cannot make the data redundant by generating the parity with only the data received from the host, and needs to calculate and generate new redundant data (new parity) using the old data stored in the drive of the storage device.

Therefore, the core performs the process of reading the old data from the drive when calculating the new parity. Therefore, drive read processing occurs in random write processing. The destage process in the random write process is performed asynchronously. When the core starts the destage process in the random write process with the amount of dirty data on the cache region exceeding a threshold, the process proceeds to step S007 to determine the performance specialized IO process of the drive read processing.

Step S007 is a conditional branching step of determining the drive read processing method of the storage device. In order to increase the throughput of the host request by the storage device or to reduce the host request processing time as short as possible when the host request and the state of the storage device meet specific conditions, the core may process the host request in a particular way. Subsequently, this process is called the "performance specialized IO process".

In step S007, the core determines whether to execute normal IO processing that does not meet specific processing conditions or execute specialized IO processing that meets specific processing conditions. If it is determined that the core performs the normal IO processing (NO), the process proceeds to step S008. If it is determined that the core performs the performance specialized IO processing (YES), the processing proceeds to step S014. As a specific determination method, any of the following methods may be used. For example, when the core reads the condition determining bit map table used for determining the IO request processing method prepared on the main memory, determines that the buffer data region may be used and thereby the cache control processing may be omitted, and a bit instructing the execution of high-performance processing is 1, it may be determined to perform the performance specialized IO process. Further, when a request from a specific host or a request for a volume of a specific drive is received, it may be determined to perform the performance specialized IO process. Furthermore, when the processor core operating rate of the storage device (the ratio of the processing time of the core to the operating time of the core) exceeds a predetermined threshold, for example, 50%, and the proportion of the dirty data stored in the cache data region of the main memory exceeds a predetermined threshold, for example, 60%, it may be determined to perform the performance specialized IO process.

Step S008 is a step in which the core specifies and exclusively uses a work region for transferring data to the host on the transfer destination cache data region of the main memory, as the normal IO process. The core interprets the contents of the host request and specifies LBA in the NVMe drive in which data requested by the host is stored. To confirm whether the host data corresponding to the LBA is present in the cache region, the core refers to the cache directory. When it is determined that the cache miss occurs as the result of referring, the core searches for the data transfer destination segment on the cache data region.

As the result of the search, if there is an unallocated region, the core operates the cache control table stored in the control data region and performs exclusion processing so that other cores and devices cannot be operated. This is to prevent the cache region on the main memory from being interfered by other processes until the host IO processing is completed.

As the result of the search, if there is no unallocated region, the core discards the contents of the segment storing the clean data, and makes a state transition to the unallocated region, or destages the dirty data, thus causing the contents of the segment to transition from the dirty state to the clean state. Thereby, the state transition to the unallocated region is implemented and then the afore-described exclusive processing is performed. At this time, the target segment typically selects a segment stored in the main memory on the side of the storage cluster that has accepted the request of the host. The invention is not limited thereto, and a segment stored in the main memory on the other storage-cluster side may be selected.

Step S009 is a step in which the core creates on the main memory a command (a read command from the drive, hereinafter referred to as "drive read command") for instructing the drive to make a data transfer request. The instruction format of NVMe drive conforms to the read command format of NVM express.

Step S010 is a step in which the core operates the IO page table corresponding to the transfer destination cache data region and permits data transfer from the drive to the transfer destination cache data region. The core operates the IO page table shown in FIG. 3 to change the memory access right of the IO page table corresponding to the transfer destination region from "Read permitted, Write prohibited" to "Read permitted, Write permitted". The following processing is performed as the switching processing by the core. First, the NVMe drive instructing the transfer is specified. Next, the physical address corresponding to the transfer destination region is specified, and the IO page table to be operated is specified. Finally, the bits of the table are operated and the memory access right is switched.

In order to confirm the switching of the memory access right, the core operates the register of the IOMMU and performs invalidation processing of the IO page table cached in the IOMMU. In step S010, the application of the memory access right change is confirmed by causing the IO page table whose memory access right has been changed to be cached to the IOMMU again.

Step S011 is a step in which the core instructs the drive to execute drive read processing. If the instruction method for executing the drive read process depends on the design and implementation of the drive, the core may directly give instruction by operating the register of the media controller in the drive, or may indirectly give instruction by executing instruction on the main memory with the core or devices other than the core (memory write) to cause the drive to be polled.

Step S012 is a step in which the core confirms the receipt of the process response completion of the drive. When the drive completes the data transfer from the medium in the drive to the processor main memory, it performs the memory write of the completion notification in the queue for receiving the completion response on the main memory. The core checks the completion by reading this completion notification. Further, the method of the process response completion may be separate means. For example, the MSI of the drive may be issued to one or more cores and the completion may be notified by an interrupt. Alternatively, it may be notified by directly writing in a register of an external device connected to the processor, such as the host I/F.

Step S013 is a step in which the core operates the IO page table corresponding to the transfer destination cache data region and permits the data transfer to the transfer destination cache data region of the drive. The core operates the IO page table shown in FIG. 3 to change the memory access right of the IO page table corresponding to the transfer destination region from "Read permitted, Write permitted" to "Read permitted, Write prohibited". The following processing is performed as the switching processing by the core. First, the NVMe drive instructing the transfer is specified. Next, the physical address corresponding to the transfer destination region is specified, and the IO page table to be operated is specified. Finally, the bits of the table are operated and the memory access right is switched.

In order to confirm the switching of the memory access right, the core operates the register of the IOMMU and performs invalidation processing of the IO page table cached in the IOMMU. In step S013, the application of the memory access right change is confirmed by causing the IO page table whose memory access right has been changed to be cached to the IOMMU again.

Next, the case where it is determined that the core performs the performance specialized IO processing in step S007 will be described. In step S014, the core specifies the temporary region of the transfer destination as the performance specialized IO process. By not performing the cache control, the processing amount for occupying the transfer destination region may be reduced. Thus, it is possible to select the buffer region used in the performance specialized IO processing with a processing time that is shorter than that of the normal IO processing.

Steps S009, S011 and S012 subsequent to step S014 are the same as described above.

If the host request is the Read processing after the above processing, the core instructs the host I/F to transfer the user data from the main memory to the host, sends the host data on the main memory to the host I/F, receives a data reception completion response from the host, and terminates the processing of the host request at the time of recognizing the response reception. When the host request is the random write process with the write request, the core destages the new data and the new parity generated by the RMW (Read-Modify-Write) process and terminates the destage process upon completion of destage.

FIG. 5 is a figure illustrating a data transfer path from the drive of the storage device to the main memory of the processor. There are four transfer paths, P11, P12, P21, and P22. P11 and P12 are data transfer paths when a processor 321 of a storage cluster 301 requests data transfer to a drive 700, and the drive 700 transfers data to the main memory 331 of the processor. Likewise, P21 and P22 are data transfer paths when a processor 421 of a storage cluster 401 requests data transfer to the drive 700, and the drive 700 transfers data to a main memory 431 of the processor. Since P11 and P12 and P21 and P22 are symmetric in transfer path and operation with respect to the storage clusters 301 and 401, description will be made with reference to P11 and P12 on the storage cluster 301.

P11 is the data transfer path in which a core 322 that has accepted the request from the host (not shown) (hereinafter referred to as "host request") executes the control program of the storage cluster 301, it is determined that the normal IO processing is executed as the result of step S007 shown in FIG. 4, and the segment used as the cache for data transfer is allocated in the main memory 331 of the storage cluster 301. When it is determined that the normal IO processing is executed as the result of step S007 shown in FIG. 4, in step S008, a core 322 secures the segment as the data transfer destination from the drive 700 to the cache data region D131 of the main memory 331 of the storage cluster 301, and performs exclusive processing. The core 322 requests that the drive 700 performs drive read processing (data transfer from the drive to the main memory) as the data transfer destination in the segment subjected to the exclusive processing. According to this request, the drive 700 performs data transfer to the cache data region D131 of the main memory 331 of the storage cluster 301 on the side that has accepted the host request.

P12 is the data transfer path in which the core 322 that has accepted the request from the host executes the control program of the storage cluster 301, it is determined that the performance specialized IO processing is executed as the result of step S007 shown in FIG. 4, and the buffer region used as the buffer for data transfer is allocated in the main memory 331 of the storage cluster 301. When it is determined that the performance specialized IO processing is executed as the result of step S007 shown in FIG. 4, in step S014, the core 322 selects the buffer data region D121 of the main memory 331 of the storage cluster 301 as the data transfer destination of the drive, and performs exclusive processing in a part of the buffer data region D121. The core 322 requests that the drive 700 performs drive read processing (data transfer from the drive to the main memory) as the data transfer destination in the buffer data region D121 subjected to the exclusive processing. The drive 700 performs data transfer to the buffer data region D121 of the main memory 331.

As an exception, in order to improve the cache hit ratio for the host request, the control program on the storage cluster 301 side may secure the segment for data transfer in the main memory on the cluster 401 side. In that case, by executing the control program of the storage cluster 301, the core 322 instructs that a core 422 (control program of the storage cluster 401) transfers data to the drive via communications between the clusters. Upon receiving the instruction, the core 422 requests that the drive 700 performs the data transfer to the main memory 431 of a desired storage cluster 401 by executing the control program of the storage cluster 401. Upon receiving the request, the drive 700 transfers data to a desired storage cluster 401 according to the path of P21.

It should be noted that the present invention is not limited to the above-described examples, but includes various modifications. For example, the above-described examples have been described in detail in order to facilitate the understanding of the invention, but are not necessarily limited to those having all the above-described configurations. Further, some configurations of the example may be added to, deleted from, and replaced with other configurations.

REFERENCE SIGNS LIST

201: storage controller
301, 401: storage cluster
311, 411: host I/F
321, 421: processor
322, 422: processor core (core)
323, 423: IOMMU
331, 431: main memory of processor (main memory)
500: drive box
600: switch
700: drive
D111, D211: control data region
D121, D221: buffer data region
D131, D231: cache data region

The invention claimed is:

1. A storage device comprising:
two or more clusters;
a memory drive connected to each of the clusters;
a main memory belonging to each of the clusters to store data related to an IO request; and
a processor belonging to each of the clusters to control access to the main memory, wherein
the main memory includes a buffer data region where writing from the memory drive is permitted, and a cache data region where the writing is prohibited, and
the processor selects the buffer data region as a transfer destination of data related to the IO request from the memory drive when the IO request meets a predetermined condition that the storage device performs high-performance IO processing, and selects the cache data region as the transfer destination of data related to the IO request from the memory drive while permitting writing to the cache data region when the IO request does not meet the predetermined condition that the storage device performs high-performance IO processing.

2. The storage device according to claim 1, wherein
the processor prohibits writing from the memory drive to the cache data region, when the writing to the cache data region where the writing is permitted is completed.

3. The storage device according to claim 1, wherein
the processor determines whether the IO request meets the predetermined condition that the storage device performs high-performance IO processing or not, when the IO request is a read process and target data of the read process is not present in a data cache provided in the main memory, or when the IO request is a random access write process and it is necessary to read data from the memory drive according to the write process.

4. The storage device according to claim 1, wherein
the processor determines whether the IO request meets the predetermined condition that the storage device performs high-performance IO processing or not based on a bit map table for determining conditions.

5. An IO request processing method with respect to a main memory including a buffer data region where writing from a memory drive is permitted and a cache data region where the writing is prohibited, the method comprising:
 a first step of determining whether an IO request meets a predetermined condition that a storage device performs high-performance IO processing or not;
 a second step of selecting the buffer data region as a transfer destination of data related to the IO request from the memory drive when the IO request meets the predetermined condition that the storage device performs high-performance IO processing; and
 a third step of selecting the cache data region as the transfer destination of data related to the IO request from the memory drive while permitting writing to the cache data region when the IO request does not meet the predetermined condition that the storage device performs high-performance IO processing.

6. The IO request processing method according to claim 5, further comprising:
 a fourth step of prohibiting writing from the memory drive to the cache data region when writing to the cache data region where the writing is permitted is completed, subsequent to the third step.

7. The IO request processing method according to claim 5, wherein
the first step is a step executed when the IO request is a read process and target data of the read process is not present in a data cache provided in the main memory, or when the IO request is a random access write process and it is necessary to read data from the memory drive according to the write process.

8. The IO request processing method according to claim 5, wherein
the first step is a step in which the processor for executing an IO request process is determined based on a bit map table for determining conditions.

* * * * *